Dec. 10, 1935. C. AMICO 2,023,659
WIND MOTOR
Filed Oct. 21, 1933 2 Sheets-Sheet 1
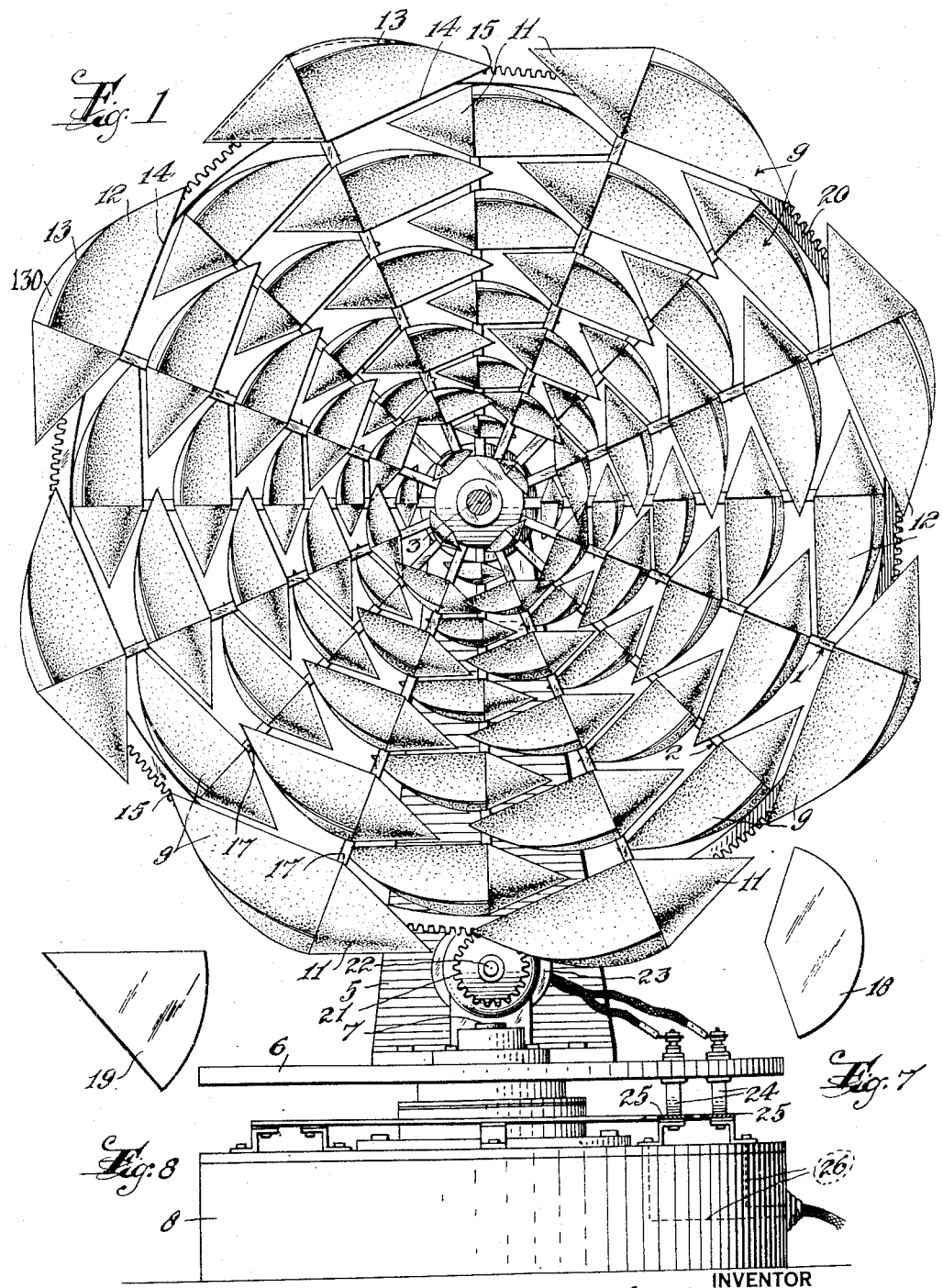
INVENTOR
Charles Amico,
BY
Harry S. Cook,
ATTORNEY Dec. 10, 1935.  C. AMICO  2,023,659
WIND MOTOR
Filed Oct. 21, 1933  2 Sheets-Sheet 2
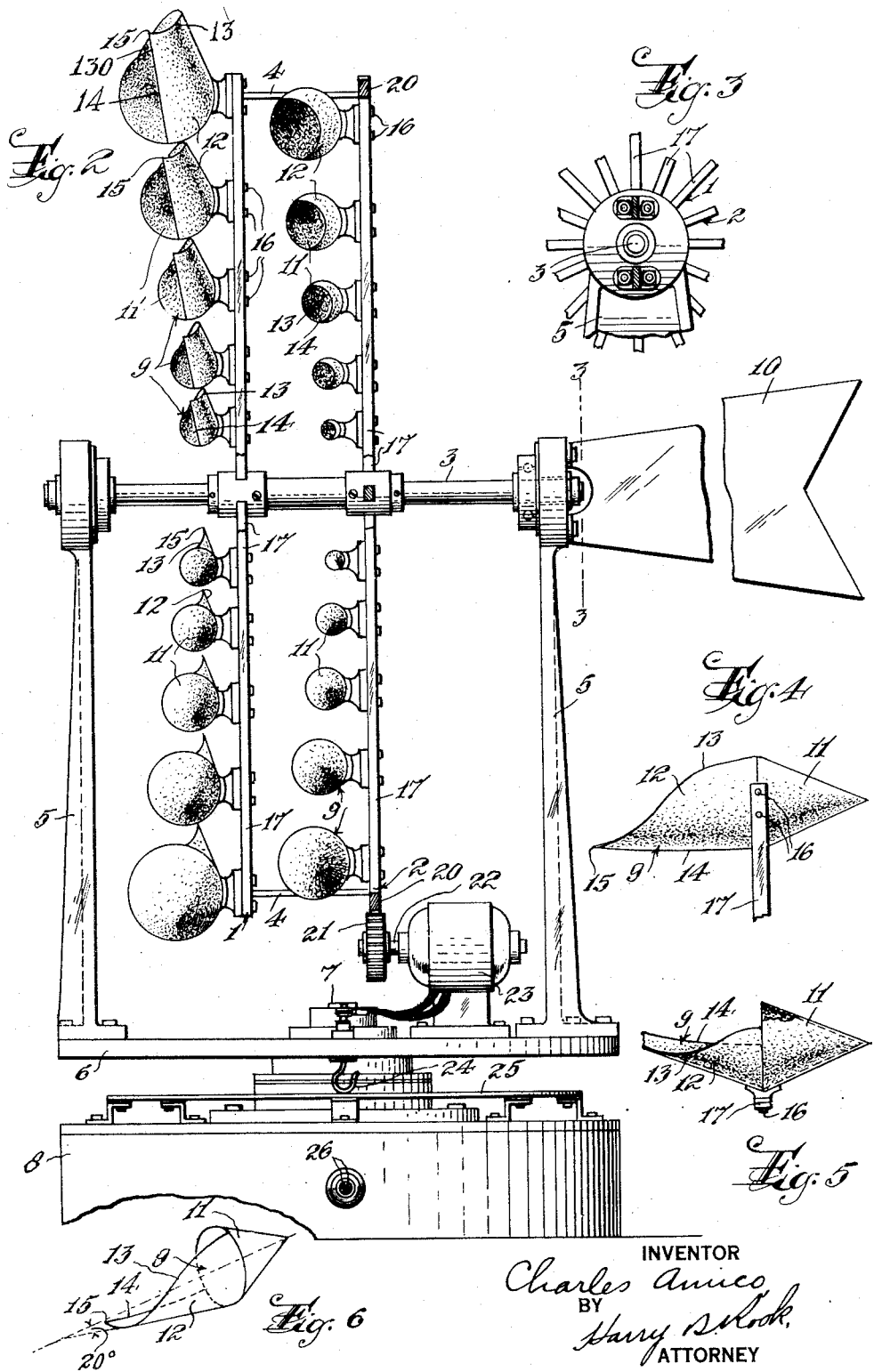
INVENTOR
Charles Amico
BY
Harry S. Kook
ATTORNEY Patented Dec. 10, 1935

2,023,659

UNITED STATES PATENT OFFICE 2,023,659

WIND MOTOR

Charles Amico, Passaic, N. J.

Application October 21, 1933, Serial No. 694,601

20 Claims. (Cl. 170—79)

This invention relates in general to wind motors and more particularly to an impeller to be actuated by air currents and translate them into rotary motion for driving a machine for any desired purpose, for example, for driving a dynamo to produce electricity, or for operating a pump or the like.

One object of the invention is to provide an impeller of the general character described which shall embody a novel and improved construction and combination of a plurality of blades and means for mounting them on a rotary shaft whereby air currents shall exert forces on the blades and rotate the shaft to provide a large amount of power efficiently and economically.

Another object is to provide such an impeller which shall include a wheel or rotary frame to be mounted to rotate in a plane at approximately right angles to the direction of the air currents, and a plurality of novel and improved blades mounted on said wheel each comprising a cup arranged with its axis approximately perpendicular or normal to the direction of the air currents or parallel to the plane of rotation of the wheel, and a tail fin or current deflector projecting from the perimeter of its mouth to direct air currents into the cup whereby the air currents shall exert forces on the cup to rotate the wheel.

A further object is to provide an impeller of this character which shall comprise two coaxial rotary wheels or frames in closely spaced relation each having a plurality of such blades with the blades on one wheel disposed in staggered relation to the blades on the other wheel, whereby air currents leaving the blades on one wheel shall impinge upon the blades of the other wheel, to obtain a maximum utilization of power from the air currents.

Other objects are to provide a novel and improved impeller blade for fluid current motors whereby a maximum of power can be obtained from fluid currents; to provide an impeller of the character described which shall be simple and inexpensive, and to obtain advantages and results as will be brought out by the following description.

Referring to the accompanying drawings in which corresponding and like parts are designated by the same reference characters throughout the several views, Figure 1 is a front elevation of a wind motor including an impeller embodying my invention.

Figure 2 is a side elevation thereof with portions broken away for clearness in illustration.

Figure 3 is a transverse vertical sectional view on the line 3—3 of Figure 2.

Figure 4 is a rear elevation of one of the blades.

Figure 5 is a top plan view thereof.

Figure 6 is a schematic perspective view of one of the blades, and

Figures 7 and 8 are developments of the cone and tail fin, respectively.

Specifically describing the illustrated embodiment of the invention, the wind motor is shown as comprising two rotary frames or wheels 1 and 2 which are mounted coaxially on a shaft 3 to rotate together, the wheels also preferably being connected by tie rods 4. The shaft 3 is journaled in bearing brackets 5 which are mounted on a turntable 6 rotatable about an axis 7 on a fixed support 8. On the face of each wheel 1 and 2 are mounted a plurality of blades 9, and a vane 10 is mounted on the bearing bracket 5 at the rear of the wheels for rotating the turn-table so as to hold the wheels facing the air currents, regardless of changes in the direction of the wind or air currents. The blades 9 rotate the wheels in planes approximately perpendicular to the direction of the air currents, as hereinafter described.

As shown, each blade 9 comprises a cup 11 which is preferably conical with the plane of its rim perpendicular to its axis of generation, and the tail fin or current deflector 12 projecting from and conforming to the rim of the cup for preferably more than one-half but substantially less than the whole of the perimeter of said rim. The edges 13 and 14 of the tail fin are helically curved and meet in a point 15 so that the tail fin is of gradually decreasing width outwardly from the rim of the cup. The blades are secured on their respective wheels 1 and 2 by any suitable means such as bolts 16, with the apexes of the cups facing in the same direction circumferentially of the wheels and the concave sides of the tail fins facing away from the wheels in opposition to the wind currents, and with the axes of generation of the cups disposed approximately parallel to the planes of rotation of the wheels and approximately perpendicular to radial lines of the wheels. In other words the cup opens in a direction substantially parallel with the plane of rotation of the wheel and transverse to the axis of rotation. As shown, preferably the blades are arranged in equidistantly spaced radial rows and the blades increase in size outwardly from the axis of rotation of the wheels. Also, preferably the blades of the two wheels are disposed in staggered relation, that is, the blades of one wheel are disposed in juxtaposition to the spaces between adjacent blades of the other wheel.

In operation, the vane 18 holds the wheels in planes approximately perpendicular to the direction of the air currents or wind, and the air currents impinge upon the tail fins 12 and are directed or deflected into the respective cups with a whirling motion. The cups serve as reservoirs and the force of the air currents is applied to the cups so as to rotate the wheels with the apexes of the cups leading. The apexes of the cups cut through the air and the helical edges 13 and 14 of the tail fins have a screw-like action in the air as the wheel rotates, which tends to reduce the resistance to passage of the blades through air. Excess air currents and air currents leaving the cups pass over the helical edges of the tail fins and due to the gradually decreasing width of the tail fins outwardly from the cups, the resistance to clearance of the fins by the air is gradually reduced so as to provide a minimum of retardation of movement of the blades by the receding air currents. The currents which pass from the blades of the forward wheel 1 impinge upon the blades of the rear wheel 2 so that substantially all air currents in the area of the impeller are utilized.

Preferably, the tail fins 12 are inclined toward the axes of the respective cups at angles of approximately twenty degrees as shown in Figures 5 and 6, so as to induce the air currents to flow into the cups and reduce the tendency of the air currents to flow away from the cups along the tail fins. The tail fins extend around more than half the perimeter of the rim of the cups to restrain flow of air currents radially of the wheels over the edges of the tail fins, and as air currents naturally flow outwardly from the axis of the wheels, the outer edges 13 of the tail fins extend toward the front of the blades at 130 further than do the other edges 14 so as to restrain radially outward movement of the air currents, and direct the currents into the cups.

As shown, the wheels or frames 1 and 2 have a plurality of radial spokes 17 and the blades are secured to these spokes, but it is within the scope of the invention to make the wheels or frame of any suitable structure through which air currents may pass.

Also, the blades may be formed in any suitable manner, for example, cast in one piece, or the cup may be formed of a sheet metal blank 18 and the tail fin may be formed of a similar blank 19 soldered or otherwise secured to the rim of the cup.

The wheels may be geared to a machine or power transmitter in any suitable manner, but for the purposes of illustration I have shown the wheel 2 provided with a ring gear 20 which meshes with a pinion 21 on the shaft 22 of an electrical dynamo 23 the brushes of which may be connected in known manner to spring contacts 24 which cooperate with collector rings 25 which in turn may be connected in any suitable manner to line wires 26.

The impeller embodying the invention will efficiently produce a maximum of power from wind currents of given velocity, and the particular construction and arrangement of the blades provides for substantially complete utilization of the face area of the frame or wheel for the production of power. The impeller will rotate steadily in air currents of small velocity, being extremely sensitive to slight currents, and it may efficiently rotate at high speeds. The cups in effect provide reservoirs for the air currents, and while air currents are moving, provide a constant source of potential energy. The blades are simple in construction and their design obviates the necessity for a feathering structure with the attendant complications.

It will be understood by those skilled in the art that the particular details of construction illustrated and described are primarily for the purpose of explaining the principles of the invention and that the invention may be embodied in other structure without departing from the spirit or scope of the invention. Also, the blade embodying the invention may be utilized for translating air currents for driving other bodies; for example, a dirigible airship may have a plurality of the blades mounted on the sides of the ship's frame with the apexes of the cases facing forwardly so that air currents flowing in directions at angles to the longitudinal axis of the ship will be deflected into the cups to drive the ship.

Having thus described my invention, what I claim is:

1. In an impeller, a rotary frame to rotate in a plane approximately perpendicular to the direction of air currents, and a plurality of blades thereon each comprising a conical cup having its axis of generation approximately parallel to the plane of rotation and perpendicular to a radial line of the frame, and a tail fin projecting from and conforming to the rim of the cup for a portion of the perimeter of the latter to direct air currents into the cup.

2. The impeller set forth in claim 1 wherein the longitudinal edges of said tail fin are helical.

3. In an impeller, a rotary frame, to rotate in a plane approximately perpendicular to the direction of air currents, and a plurality of blades thereon each comprising a conical cup having its axis of generation approximately parallel to the plane of rotation and perpendicular to a radial line of the frame, and a tail fin projecting from and conforming to the rim of the cup for more than one-half but substantially less than the whole of the perimeter of the latter to direct air currents into the cup.

4. The impeller set forth in claim 3 wherein the longitudinal edges of said tail fin are helical.

5. The impeller set forth in claim 1 wherein the longitudinal edges of said tail fin are helical and meet in a point.

6. The impeller set forth in claim 3 wherein the longitudinal edges of said tail fin are helical and meet in a point.

7. The impeller set forth in claim 1 wherein said fin is inclined toward the axis of the cup outwardly of the rim of the cup.

8. In an impeller, a rotary frame to rotate in a plane approximately perpendicular to the direction of air currents, and a plurality of blades thereon each comprising a conical cup having its axis of generation approximately parallel to the plane of rotation and perpendicular to a radial line of the frame, and a tail fin projecting from and conforming to the rim of the cup for more than one-half of the perimeter of the latter to direct air currents into the cup, said fin being inclined toward the axis of the cup outwardly of the rim of the cup away from the apex thereof.

9. The impeller set forth in claim 1 wherein said fin is inclined toward the axis of the cup at an angle of approximately twenty degrees outwardly of the rim of the cup away from the apex of the cup.

10. In an impeller, a rotary frame to rotate in a plane approximately perpendicular to the direction of air currents, and a plurality of blades thereon each comprising a conical cup having its axis of generation approximately parallel to the plane of rotation and perpendicular to a radial line of the frame, and a tail fin projecting from and conforming to the rim of the cup for more than one-half of the perimeter of the latter to direct air currents into the cup, said fin being inclined toward the axis of the cup at an angle of approximately twenty degrees outwardly of the rim of the cup in a direction away from the apex of the cup.

11. In an impeller, two frames to be rotatable coaxially together in planes approximately perpendicular to the direction of air currents, and a plurality of blades mounted on each frame, each blade comprising a conical cup having its axis of generation approximately parallel to the plane of rotation and perpendicular to a radial line of the frame, and a tail fin projecting from and conforming to the rim of the cup for a portion substantially less than the whole of the perimeter of the latter to direct air currents into the cup, the blades of one frame being in staggered relation to the blades of the other frame, so that air currents leaving the blades of one frame can impinge upon the blades of the other frame.

12. In an impeller, a rotary frame to rotate in a plane approximately perpendicular to the direction of air currents, and a plurality of blades mounted thereon in radial rows, each blade comprising a conical cup having its axis of generation approximately parallel to the plane of rotation and perpendicular to a radial line of the frame, and a tail fin projecting from and conforming to the rim of the cup for a portion of the perimeter of the latter to direct air currents into the cup, the blades gradually increasing in size outwardly from the axis of rotation of the frame.

13. The impeller set forth in claim 1 wherein said tail fin is of gradually decreasing width outwardly from the rim of the cup.

14. The impeller set forth in claim 1 wherein said tail fin is of gradually decreasing width outwardly from the rim of the cup and the longitudinal edges of the fin meet in a point.

15. An impeller comprising a rotary frame mounted to rotate in plane approximately perpendicular to air currents, and a plurality of blades mounted on the face of said frame, each including a conical cup with its axis of generation approximately parallel to the plane of rotation and perpendicular to a radial line of the frame, and a tail fin projecting from and conforming to the rim of said cup for a portion of the perimeter of the latter with its concave side facing the air currents to deflect air currents into the cup.

16. An impeller comprising a rotary frame mounted to rotate in a plane approximately perpendicular to air currents, and a plurality of blades mounted on the face of said frame, each including a conical cup with its axis of generation approximately parallel to the plane of rotation and perpendicular to a radial line of the frame, and means for deflecting air currents into said cup.

17. An impeller comprising a rotary frame mounted to rotate in a plane approximately perpendicular to air currents, and a plurality of blades mounted on the face of said frame, each including a conical cup with its axis of generation approximately parallel to the plane of rotation and perpendicular to a radial line of the frame, and a tail fin projecting from and conforming to the rim of said cup for a portion of the perimeter of the latter with its concave side facing the air currents to deflect air currents into the cup, said blades being arranged in equidistantly spaced radial rows and the longitudinal edges of said tail fins being helical and meeting in a point.

18. A blade for use in fluid current impellers or propellers comprising a conical cup having the plane of its rim perpendicular to its axis and having an air current deflector fin projecting from and conforming to the rim of the cup for a portion substantially less than the whole of the perimeter of the latter to direct air currents into the cup, the deflector fin gradually decreasing in width outwardly of the rim of the cup and being inclined toward the axis of the cup outwardly of said rim in a direction away from the apex of the cup.

19. An impeller comprising a rotary frame mounted to rotate in a plane approximately perpendicular to air currents, and a plurality of blades mounted on the face of said frame, each including a conical cup opening in a direction substantially parallel to said plane and transverse to the axis of rotation of the frame, and a tail fin projecting from and conforming to the rim of the cup for a portion of the perimeter thereof with its concave side facing the air currents to deflect air currents into the cup.

20. The impeller set forth in claim 19 wherein said tail fin is of gradually decreasing width outwardly from the rim of the cup.

CHARLES AMICO.